United States Patent
Lee et al.

(10) Patent No.: US 10,208,847 B1
(45) Date of Patent: Feb. 19, 2019

(54) STRUCTURE OF TRANSMISSION MOUNT

(71) Applicants: HYUNDAI MOTOR COMPANY, Seoul (KR); KIA MOTORS CORPORATION, Seoul (KR)

(72) Inventors: Kwan-Ho Lee, Hanam-si (KR); Hee-Sung Lee, Suwon-si (KR); Dong-Wook Lee, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/818,492

(22) Filed: Nov. 20, 2017

(30) Foreign Application Priority Data

Aug. 21, 2017 (KR) .......................... 10-2017-0105452

(51) Int. Cl.
*F16H 57/025* (2012.01)
*B60K 17/00* (2006.01)

(52) U.S. Cl.
CPC ............ *F16H 57/025* (2013.01); *B60K 17/00* (2013.01); *F16F 2224/025* (2013.01)

(58) Field of Classification Search
CPC ......... F16H 57/025; B60K 17/00; B60K 5/12; B60K 5/1208; B60K 5/1291; F16F 3/0875; F16F 3/0873; F16F 1/371; F16F 1/376; F16F 1/36; F16F 1/38; F16F 1/3849; F16F 1/3863; F16F 2224/025; F16F 2226/045; F16F 15/08; F16M 13/02; Y10T 29/49611
USPC ....... 248/674, 634, 636, 638, 646, 647, 672, 248/678, 671; 267/140.12, 140.13
See application file for complete search history.

(56) References Cited

U.S. PATENT DOCUMENTS

| | | | |
|---|---|---|---|
| 9,151,352 B2* | 10/2015 | Mayr | F16F 1/3732 |
| 9,476,479 B2* | 10/2016 | Nakamura | F16F 1/3842 |
| 9,551,396 B2* | 1/2017 | Yoshii et al. | F16F 15/08 |
| 2015/0224959 A1* | 8/2015 | Suminaka et al. | B60R 22/405 |
| 2015/0252870 A1* | 9/2015 | Kashihara | F16M 13/02 248/634 |
| 2015/0276010 A1* | 12/2015 | Nakamura et al. | F16F 15/08 |
| 2016/0226335 A1* | 8/2016 | Nicoloff | F16F 1/3835 |
| 2017/0074348 A1* | 3/2017 | Okajima | F16F 1/3849 |

(Continued)

FOREIGN PATENT DOCUMENTS

| KR | 10-1165211 B1 | 7/2012 |
|---|---|---|
| KR | 10-1256860 B1 | 4/2013 |
| KR | 10-2014-0050850 A | 4/2014 |

*Primary Examiner* — Nkeisha Smith
(74) *Attorney, Agent, or Firm* — McDermott Will & Emery LLP (57) ABSTRACT

A transmission mount installed in a vehicle body in order to support the weight of a transmission includes a housing bracket including a housing having stopper-fixing holes and stopper-position-fixing portions, a stopper having insertion-protruding portions formed so as to be inserted into the stopper-position-fixing portions, fixing pieces formed so as to be inserted into the stopper-fixing holes and curled, and fixing holes formed near the fixing pieces, and an inner steel member having protruding pieces formed so as to be inserted into the fixing holes formed in the stopper. The stopper contacts a transmission bracket of a powertrain when a transmission of the powertrain is biased to the left in response to a right turn of a vehicle, thereby suppressing movement of the powertrain and further improving steering performance.

4 Claims, 7 Drawing Sheets

(56) References Cited

U.S. PATENT DOCUMENTS

2017/0279334 A1* 9/2017 Nicoloff ............... B62D 21/11
2018/0009480 A1* 1/2018 Kagami et al. ........ B62D 21/11

* cited by examiner

FIG 1

--RELATED ART--

STRUCTURE OF TRANSMISSION MOUNT

CROSS-REFERENCE TO RELATED APPLICATION

This application is based on and claims the benefit of priority to Korean Patent Application No. 10-2017-0105452, filed on Aug. 21, 2017 with the Korean Intellectual Property Office, the disclosure of which is incorporated herein by reference.

TECHNICAL FIELD

The present disclosure relates to a structure of a transmission mount installed to a vehicle body in order to support the weight of a transmission, and more particularly, to a structure of a transmission mount, which includes a stopper configured to contact a transmission bracket of a powertrain when a transmission of the powertrain is biased to the left in response to a right turn of a vehicle, thereby suppressing movement of the powertrain and further improving steering performance.

BACKGROUND

Automobiles primarily employ monocoque bodies instead of frame bodies, because they are lightweight and excellent in productivity. A monocoque body is a structure that obviates a separate frame, and a powertrain, which is constituted by coupling an engine and a transmission to each other, is directly mounted to a vehicle body.

Therefore, in a vehicle manufactured of a monocoque body, suspension and chassis parts are mounted to a vehicle body because the vehicle body itself functions as a frame. However, in order to prevent vibrations of a powertrain from being directly transferred to the vehicle body and to disperse shocks in an event of a vehicle collision, a subframe and mounting members are mounted to the bottom of the vehicle.

The subframe is mounted to the bottom of the vehicle body so that a steering device and a suspension device, such as a suspension strut and a knuckle, can be connected thereto. The mounting members include an engine mount, which is installed to a portion of the vehicle body and is secured to an engine, a transmission mount, which is installed to another portion of the vehicle body and is secured to a transmission, and a roll-rod for connecting the engine or the transmission to the subframe.

Accordingly, the transmission mount supports the weight of the powertrain applied to the transmission and also has a vibration isolation function of preventing vibrations from the powertrain from being transferred to the vehicle body.

Figure 1:
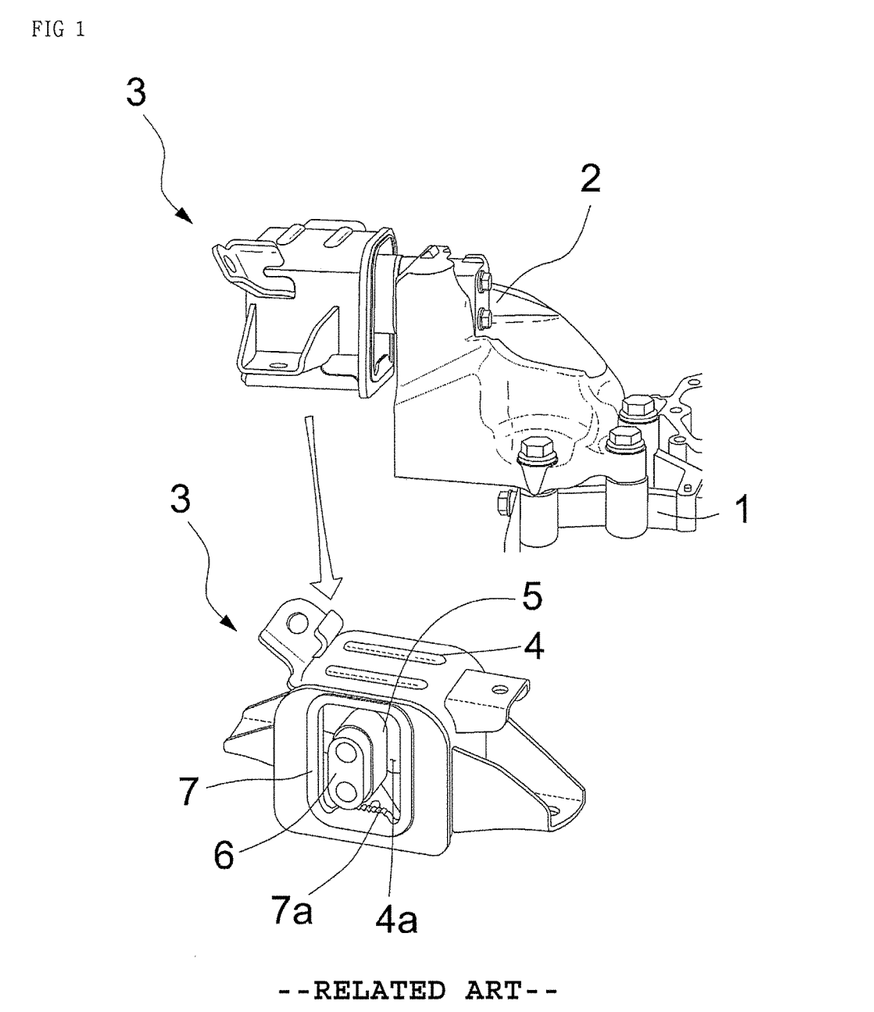
FIG. 1 is a view illustrating a stopper of a conventional transmission mount.

Referring to FIG. 1, a conventional rubber-type transmission mount 3 is structured such that an insulator 5, which is formed of an elastic material (for example, rubber or synthetic resin), and a metal core 6 are coupled to each other and are inserted together into a housing 4, which is formed in a shape of a container having a predetermined size, and such that one end portion of the metal core 6 protrudes outwards through an opening 4a, which is formed in a portion of the housing 4 that is oriented toward a transmission bracket 2 when mounted to the vehicle body. The end surface of the core 6 has a bolt hole formed therein, and the transmission mount 3 is coupled to the transmission bracket 2, which is mounted to the transmission 1, through the bolt hole by using a bolt. Accordingly, the transmission mount 3 supports the weight of the powertrain applied to the transmission and isolates vibrations of the powertrain owing to elastic deformation of the insulator 5.

Further, the transmission mount 3 additionally includes a stopper 7 in order to prevent the insulator 5 and the housing 4 from being damaged due to a sudden increase in the load that is transferred to the insulator in accordance with the traveling conditions of the vehicle.

The conventional stopper 7 has a shape of a ring that communicates with the opening 4a and is bonded to the periphery of the opening 4a. The stopper 7 has a rib 7a, which protrudes upwards from the lower side thereof in order to prevent the core 6 from moving downwards at a predetermined distance or more, thereby suppressing excessive elastic deformation of the insulator 5.

However, the conventional stopper 7 contributes to the durability in a vertical direction of the insulator since the stopper 7 controls only the downward movement of the core 6, but does not control a load in a width direction of the vehicle (a lateral direction), which is generated due to a gap between the transmission bracket 2 and the housing 4, thereby providing a negative effect on the steering performance of the vehicle.

Further, a separate stopper is bonded to the external portion of the transmission mount 3 in order to control the displacement of the powertrain when the vehicle is steered, thereby improving a sense of unity between the powertrain and the vehicle body and improving steering responsiveness and steering-tracking performance of the vehicle when the vehicle turns sharply. However, the bonding portion (the adhering portion) can be weakened by frequent turning of the vehicle, thus greatly deteriorating the robustness of the bonding.

The insulator 5 of the transmission mount 3 is secured to the bracket, and the bracket is coupled to the vehicle body. At this time, the insulator 5 of the transmission mount 3 connects the mount bracket to the powertrain (PT), and a lower bridge, which is formed integrally with the insulator 5, is formed of rubber and supports the weight of the powertrain and isolates vibrations of the powertrain. The bridge is deformed in accordance with the movement of the powertrain and consequently allows the movement of the powertrain. However, if the movement of the powertrain is excessive, when the vehicle turns sharply, the powertrain moves in the direction opposite the direction in which the vehicle turns according to the principal of action and reaction, and this movement of the powertrain may reduce a sense of unity between the powertrain and the vehicle body and may provide a negative effect on steering-tracking performance of the vehicle.

Therefore, there is a need to develop a stopper structure for the transmission mount, which may suppress movement of the powertrain so as to improve the steering performance, and which may securely fix a noise/shock-preventing bracket so as to prevent separation of the bracket and to reliably prevent the occurrence of noise.

SUMMARY

The present disclosure has been made in view of the above problems, and an object of the present disclosure is to provide a structure of a transmission mount, in which a stopper may be securely fixed by an inner steel member coupled thereto, thereby effectively preventing the occurrence of noise and separation of the stopper, and the stopper may contact a transmission bracket of a powertrain when a transmission of the powertrain is biased to the left in response to a right turn of a vehicle, thereby suppressing movement of the powertrain and further improving steering performance.

The technical objects to be achieved by the present disclosure are not limited to those mentioned above, and other objects may be clearly understood by those skilled in the art from the description given below.

In accordance with the present disclosure, a transmission mount installed in a vehicle body in order to support the weight of a transmission may include a housing bracket including a housing, having an opening formed therein, at least two stopper-fixing holes formed therein, and stopper-position-fixing portions formed at an upper portion and a lower portion of the opening, and a stopper configured to be inserted into the stopper-position-fixing portions formed in the housing bracket and to be fixed to a front surface of the housing in close contact therewith by being inserted into the stopper-fixing holes.

BRIEF DESCRIPTION OF THE DRAWINGS

The above and other objects, features and other advantages of the present disclosure will be more clearly understood from the following detailed description taken in conjunction with the accompanying drawings, in which:

FIGS. 3A to 3E are views illustrating parts that constitute the stopper of the transmission mount according to the present disclosure.

DETAILED DESCRIPTION

Reference will now be made in detail to the embodiments of the present disclosure, examples of which are illustrated in the accompanying drawings, to allow those skilled in the art to easily understand and reproduce the embodiments of the present disclosure. However, the present disclosure may be implemented in various different forms, and are not limited to the embodiments described herein.

To clearly explain the present disclosure, illustration of elements having no connection with the description is omitted, and the same or extremely similar elements are designated by the same reference numerals throughout the specification.

In addition, the terms or words used in the specification and claims of the present disclosure are not to be interpreted using typical or dictionary limited meanings, and are constructed as meanings and concepts conforming to the technical spirit of the present disclosure based on the principle that the inventors can appropriately define the concepts of the terms to explain the present disclosure in the best manner.

The present disclosure relates to a stopper, which is mounted to a transmission mount 10 in order to prevent excessive elastic deformation of an insulator 30 coupled to a core 40. Hereinafter, an exemplary embodiment of the present disclosure will be described in more detail with reference to the accompanying drawings.

Figure 2:
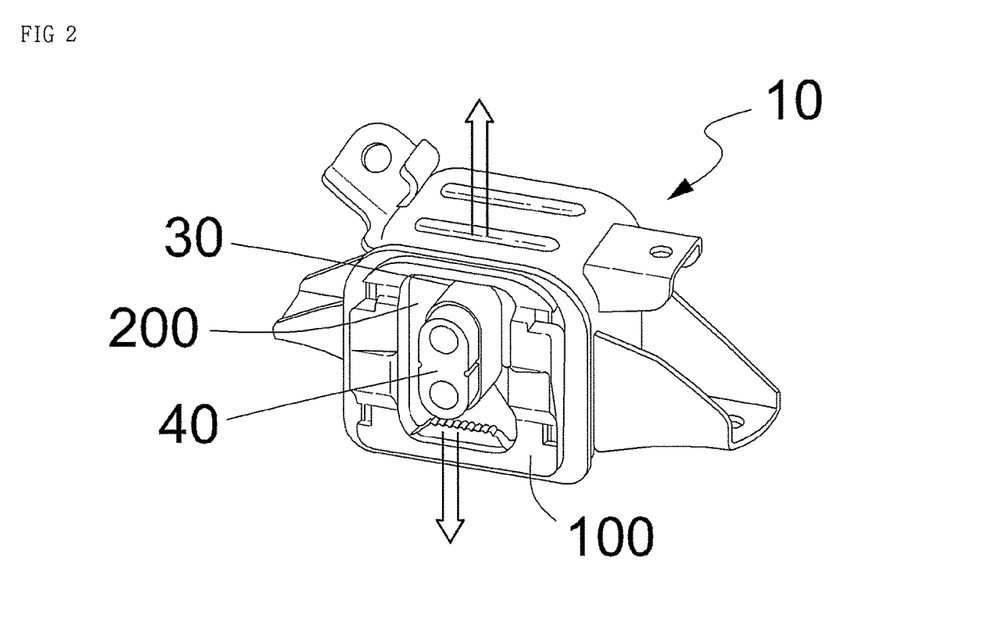
FIG. 2 is a view illustrating a stopper of a transmission mount according to the present disclosure.

The transmission mount 10 according to the present disclosure includes a housing bracket 100, a stopper 200, and an inner steel member 300.

The housing bracket 100 according to the present disclosure is configured in a similar manner to the conventional configuration described above, such that an insulator 30, which is formed of an elastic material, and a metal core 40 are coupled to each other and are inserted together into a housing 110, which is formed in the shape of a container having a predetermined size.

Figure 3A:
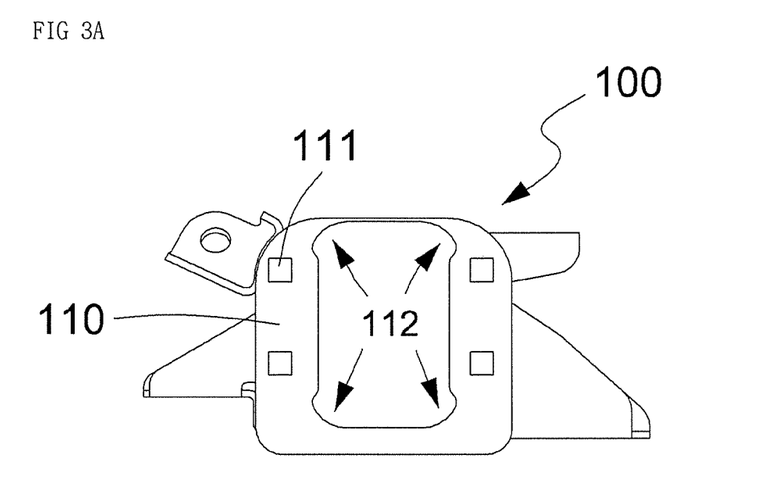
FIG. 3A is a view illustrating a bracket.

However, as shown in FIG. 3A, the housing bracket 100 according to the present disclosure is configured such that the housing 110 has an opening, into which the insulator 30 is inserted and which has stopper-position-fixing portions 112 formed at the inner upper portion and the inner lower portion thereof, and such that the housing 110 has at least two stopper-fixing holes 111 formed in portions thereof that are adjacent to the stopper-position-fixing portions 112.

The stopper-position-fixing portions 112 include arc-shaped curling cut portions, which are formed at four corners of the opening, and sides that connect the curling cut portions.

When the stopper 200 is seated in the stopper-position-fixing portions 112, the stopper 200 is able to be displaced at a desired position while absorbing dimensional tolerance of the stopper-position-fixing portions 112 due to the curling cut portions.

For example, the stopper-position-fixing portions 112 need to be formed to be larger than the insertion-protruding portions 212 of the stopper 200, which will be described later, in the interests of assembly efficiency and ensuring the lifespan of press tools, and thus the curling cut portions are required to enable the stopper 200 to be displaced at a desired position.

Figure 3B:
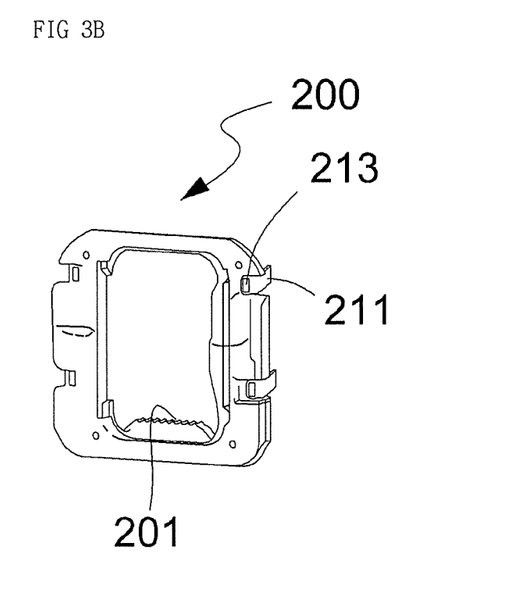
FIG. 3B is a front view of the stopper.

Described in detail, the stopper 200 is formed of a hard rubber material, and as shown in FIG. 3B, has a rib 201, which protrudes upwards from the inner lower side thereof in order to prevent the core 40 from moving downwards a predetermined distance or more. Further, as shown in FIG. 3C, the stopper 200 has insertion-protruding portions 212, which are protrudingly formed at the inner upper and lower portions thereof and have shapes corresponding to the curling cut portions so as to be inserted into the stopper-position-fixing portions 112 formed in the bracket 100.

Figure 3C:
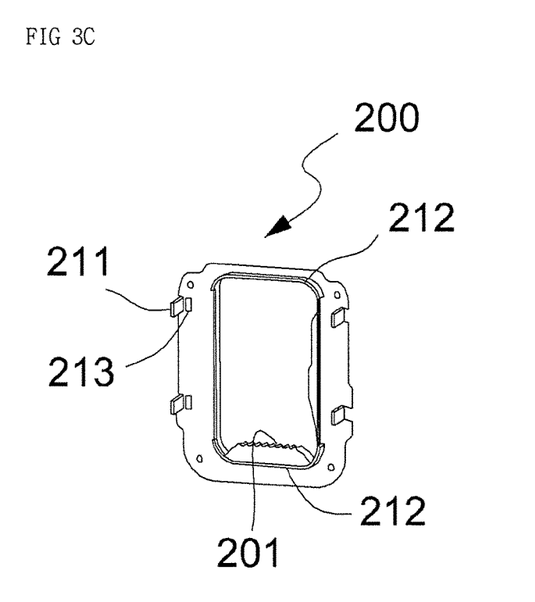
FIG. 3C is a rear view of the stopper.

Furthermore, as shown in FIG. 3C, the stopper 200 has fixing pieces 211, which are protrudingly formed at the outer sides of the upper and lower portions thereof. The fixing pieces 211 are inserted into the stopper-fixing holes 111 and are subsequently curled in the outward direction of the stopper 200.

Figure 3D:
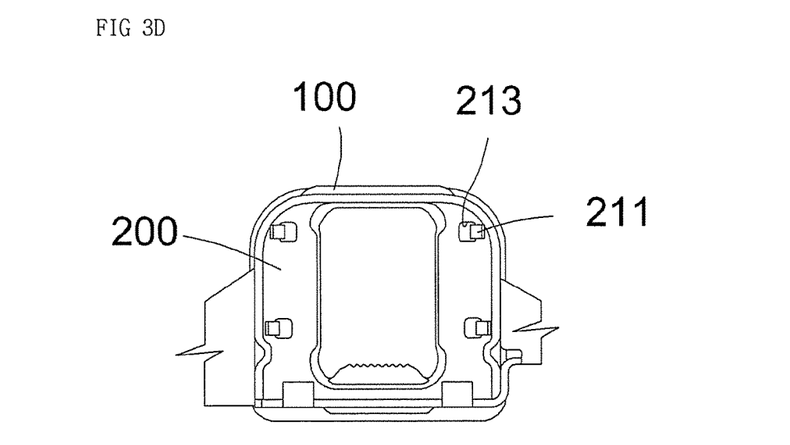
FIG. 3D is a view illustrating the state in which the stopper is mounted to the bracket.

Accordingly, the stopper 200, as shown in FIG. 3D, is coupled to the housing bracket 100.

That is, the insertion-protruding portions 212, which are formed at the inner upper and lower portions of the stopper 200, are inserted into the stopper-position-fixing portions 112 formed at the inner upper and lower portions of the housing 110, and at the same time, the fixing pieces 211, which are protrudingly formed at the outer left and right sides of the upper and lower portions of the stopper 200, are inserted into the stopper-fixing holes 111 formed in the housing 110, and are subsequently curled and fixed to the housing 110, as shown in FIG. 3D.

The stopper 200 further has fixing holes 213 formed near the fixing pieces 211, into which protruding pieces 311 of the inner steel member 300 are inserted.

Figure 3E:
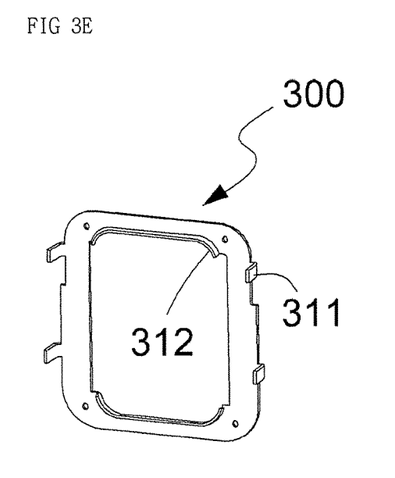
FIG. 3E is a view illustrating an inner steel member, which is formed as a separate part.

The inner steel member 300 has curved protruding portions 312, which are formed at the inner upper and lower portions thereof in order to effectively control vertical movement of the insulator 30. The inner vertical sides of the inner steel member 300 are formed so as to provide gaps through which a core bracket is efficiently assembled.

Further, the inner steel member 300 has protruding pieces 311, which are formed at the outer sides of the upper and lower portions thereof so as to be inserted into the fixing holes 213 formed in the stopper 200.

The inner steel member 300 assists in effectively fixing the stopper 200 to the bracket 100 through insertion of the insertion-protruding portions 212 of the stopper 200 into the stopper-position-fixing portions 112 formed in the bracket 100. The entire area of the inner steel member 300 may be covered with rubber in order to prevent the occurrence of corrosion and noise.

Further, the curved protruding portions 312, which are formed at the inner upper and lower portions of the inner steel member 300, are formed so as to extend laterally, whereby the curved protruding portions 312 serve to fix the position of the stopper 200 until the stopper 200 is assembled with the bracket 100 by inserting the fixing pieces 211 into the stopper-fixing holes 111 and curling the same in the outward direction of the stopper 200. Furthermore, the curved protruding portions 312 serve to reinforce the stiffness of the inner steel member 300 in order to prevent the inner steel member 300 from being deformed due to vertical displacement of the core 40.

Figure 4:
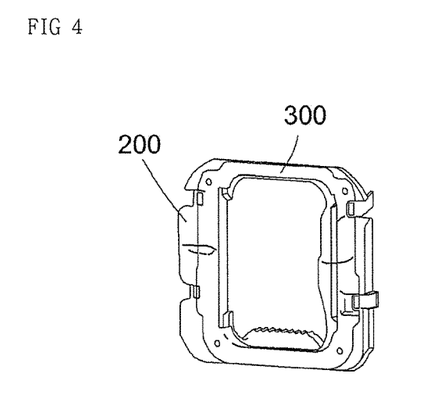
FIG. 4 is a view illustrating the state in which the inner steel member is mounted to the stopper according to the present disclosure.

As described above, as shown in FIGS. 2 to 4, the transmission mount 10 is structured such that the inner steel member 300, which is coupled to the stopper 200 in order to effectively control vertical movement of the insulator 30, has the curved protruding portions 312 formed at the inner upper and lower portions thereof. The inner steel member 300 having these curved protruding portions 312 not only fixes the position of the stopper 200 but also enables the stopper 200 to effectively suppress excessive vertical movement of the insulator 30.

Figure 5A:
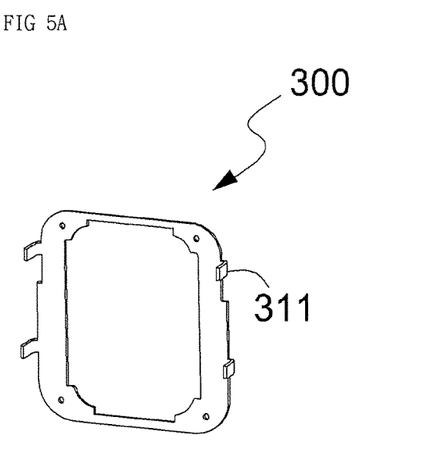
FIGS. 5A to 5C are views illustrating various embodiments of the inner steel member.
Figure 5B:
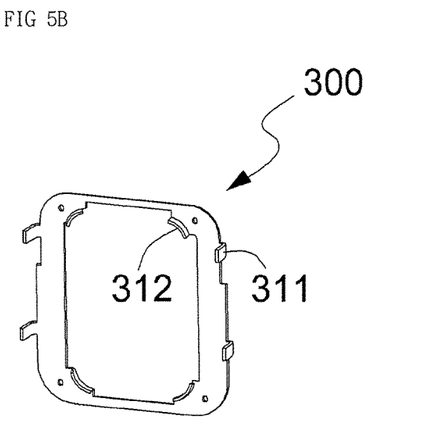
Figure 5C:
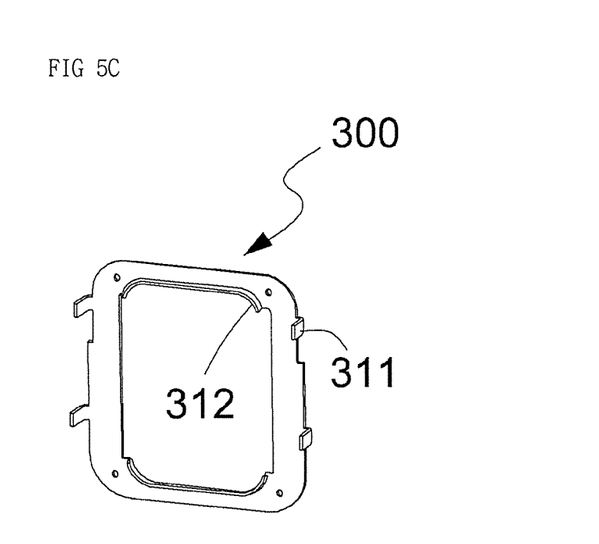

FIGS. 5A to 5C illustrate various embodiments of the inner steel member 300. As shown in FIG. 5A, the inner steel member 300 may have no curved protruding portions. As shown in FIG. 5B, the inner steel member 300 may have curved protruding portions 312, which are formed at four inner corners thereof. As shown in FIG. 5C, the inner steel member 300 may have curved protruding portions 312, which are formed so as to extend along the inner upper side and the inner lower side thereof.

As is apparent from the above description, the structure of a transmission mount according to the present disclosure has the following effects.

First, as a result of coupling an inner steel member to a stopper, it is possible to securely fix the stopper and to effectively prevent the occurrence of noise and separation of the stopper.

Second, the stopper of the transmission mount contacts a transmission bracket of a powertrain when a transmission of the powertrain is biased to the left in response to a right turn of a vehicle, thereby suppressing movement of the powertrain and further improving the steering performance (when the vehicle turns left, a stopper provided at an insulator suppresses movement of the powertrain).

Third, as a result of inserting fixing pieces of the stopper into stopper-fixing holes in a housing bracket and curling the same in the outward direction of the stopper, it is possible to prevent the insulator from being damaged due to interference between the insulator and the fixing pieces of the stopper.

Finally, as a result of forming curved protruding portions at the inner upper and lower portions of the inner steel member, which is coupled to the stopper in order to effectively control vertical movement of the insulator, it is possible not only to fix the position of the stopper but also to enable the stopper to effectively suppress excessive vertical movement of the insulator (control of vertical movement of a powertrain of a vehicle).

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A transmission mount installed in a vehicle body in order to support a weight of a transmission, the transmission mount comprising:
   a housing bracket including a housing, having an opening formed therein, at least two stopper-fixing holes formed therein, and stopper-position-fixing portions formed at an upper portion and a lower portion of the opening; and
   a stopper configured to be inserted into the stopper-position-fixing portions formed in the housing bracket, and to be fixed to a front surface of the housing in close contact therewith by being inserted into the stopper-fixing holes,
   wherein the stopper has fixing pieces protrudingly formed at left and right outer sides of upper and lower portions thereof so as to be inserted into the stopper-fixing holes and curled.

2. The transmission mount according to claim 1, wherein the fixing pieces of the stopper are curled in an outward direction of the stopper in order to prevent an insulator, which is inserted into the housing through the opening thereof, from being damaged due to interference between the insulator and the fixing pieces of the stopper.

3. A transmission mount installed in a vehicle body in order to support a weight of a transmission, the transmission mount comprising:
   a housing bracket including a housing, having an opening formed therein, at least two stopper-fixing holes formed therein, and stopper-position-fixing portions formed at an upper portion and a lower portion of the opening;
   a stopper having insertion-protruding portions, which are protrudingly formed at inner upper and lower portions thereof so as to be inserted into the stopper-position-fixing portions formed in the housing bracket, fixing pieces, which are formed so as to be inserted into the stopper-fixing holes and curled, and fixing holes, which are formed near the fixing pieces; and
   an inner steel member having protruding pieces, which are formed at outer sides of upper and lower portions thereof so as to be inserted into the fixing holes formed in the stopper, the inner steel member being fixed to the stopper in close contact therewith by insertion of the protruding pieces into the fixing holes.

4. The transmission mount according to claim 3, wherein the inner steel member has curved protruding portions formed at inner upper and lower portions thereof in order to effectively control vertical movement of an insulator which is inserted into the housing through the opening thereof.

* * * * *